United States Patent Office 2,802,798
Patented Aug. 13, 1957

2,802,798

HIGH GRADE PAVING ASPHALT AND METHOD OF MAKING SAME

Joseph A. Smith, Baltimore, Md., assignor to Esso Research and Engineering Company, a corporation of Delaware No Drawing. Application July 19, 1954,
Serial No. 444,385

6 Claims. (Cl. 260—28.5)

This invention relates to asphalt and to a process of producing the same, and refers particularly to a process of increasing the ductility of asphaltic materials and particularly to the production of an asphalt having a high ductility at low temperatures and having a high softening point.

Heretofore difficulty has been experienced in providing an asphaltic material suitable as a covering material for the construction of roads due to the difficulty of providing an asphaltic material possessing considerable ductility at low temperatures and being harder at higher temperatures. The asphalt and asphaltic materials employed for such purposes, as for example, the construction of concrete pavements, road oils, roofing material, or battery sealing compounds have had a tendency at low temperatures to contract and crack and at high temperatures to get soft.

An object of the present invention is to provide a product and process of producing the same which is better adapted for the production of a material of this class which will not crack and will possess an increased ductility at low temperatures and an increased softening point at high temperatures.

For many uses it is particularly desirable to employ an asphalt which has as high a heat softening point as possible. However, very high softening point asphalt produced by distillation or propane deasphalting is inherently hard and brittle. In 1884 it was discovered that blowing air through asphalt resulted in a product of improved tenacity, decreased brittleness at high softening point and greater resistance to weathering. For a given penetration at 77° F., asphalts produced by oxidation have much higher softening points. Furthermore, oxidation improves the temperature susceptibility, low temperature pliability and impact resistance. Unfortunately, however, oxidation reduces the penetration and ductility. For many purposes the loss suffered by these properties is a severe disadvantage to the use of oxidized asphalt.

It has now been discovered that the addition of a minor portion of a vacuum reduced asphalt, a small quantity of a certain type of hydrocarbon copolymer and a small quantity of a naphthenic aromatic or paraffinic hydrocarbon oil to an oxidized asphalt produces an excellent grade of paving asphalt which has a higher softening point than conventional grades and which at the same time changes to a lesser degree in penetration and ductility characteristics with changes in temperature.

Broadly, the present invention comprises using as the copolymer to be compounded with a bituminous material, a copolymer of a cyclic alkene and a monoolefin, which copolymer has intrinsic viscosity greater than 0.7 and having a content of combined styrene or other cyclic constituents of 20 to 80%, preferably 50%, such copolymers being produced at copolymerization temperatures below —50° C., and preferably below —70° C., a suitable operating temperature being —103° C., since this is the boiling point of liquefied ethylene. Copolymers having the desired high intrinsic viscosity cannot be produced at more elevated temperatures, such as between 0° C. and —50° C.

The intrinsic viscosity may be determined in a suitable solvent such as toluene, using the following formula for calculating the intrinsic viscosity:

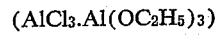

Intrinsic viscosity = $\dfrac{2.303 \log_{10} \text{relative viscosity}}{\text{Concentration of copolymer/100 ml.}}$ Instead of isobutylene, other aliphatic monoolefins may be used, preferably having more than 2 carbon atoms and preferably isolefins having 4 to 8 carbon atoms, such as isopentane (methyl-2-butene-1) or a pentane obtained by dehydration of secondary amyl alcohol.

Instead of styrenes, other polymerizable, monoolefinic aromatic hydrocarbons may be used, such as indene, the homologues of styrene, e. g. alphamethyl styrene, paramethyl styrene, alphamethyl paramethyl styrene or dihydro naphthalene.

The copolymerization is effected by mixing the two reactants, with or without a mutual solvent, if necessary, such as ethylene, propane, butane, methyl chloride or refined naphtha, and then after the cooling of the reactants to the desired low temperature, adding a Friedel-Crafts halide catalyst such as boron fluoride or boron fluoride catalyst activated by the addition of 0.1% of diethyl ether, aluminum chloride, titanium tetrachloride or aluminum alkoxide-aluminum chloride complex $$(AlCl_3.Al(OC_2H_5)_3)$$

If desired, such catalyst may be dissolved in a solvent such as carbon disulfide, a low molecular weight sulfur-free saturated hydrocarbon, a lower alkyl halide, e. g. methyl chloride, or ethyl chloride, or a mixture of methyl chloride with butane at or below the boiling point of the catalyst solvent, and then the catalyst solution cooled down, filtered and added to the reaction mixture. Alternative catalysts include:

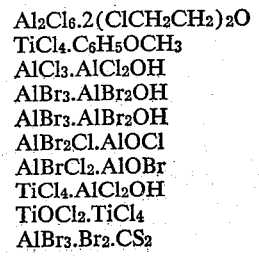

$Al_2Cl_6.2(ClCH_2CH_2)_2O$
$TiCl_4.C_6H_5OCH_3$
$AlCl_3.AlCl_2OH$
$AlBr_3.AlBr_2OH$
$AlBr_3.AlBr_2OH$
$AlBr_2Cl.AlOCl$
$AlBrCl_2.AlOBr$
$TiCl_4.AlCl_2OH$
$TiOCl_2.TiCl_4$
$AlBr_3.Br_2.CS_2$

BF₃ solution in ethylene, activated BF₃ catalyst in methyl chloride solution. Volatile solvents or diluents, e. g. propane, ethane, ethylene, methyl chloride, alkyl halides, methylene chloride or carbon dioxide (liquid or solid) may also serve as internal or external refrigerants to carry off the liberated heat of polymerization. After completion of the copolymerization, residual catalyst is hydrolyzed with alcohol, for example, isopropyl and excess catalyst removed by washing the product with water and preferably also with dilute aqueous caustic soda. The resulting copolymer may range from a viscous fluid or a relatively stiff plastic mass to a hard, tough thermoplastic resinous solid, depending upon the temperature of polymerization, the yield of polymer obtained upon the active feed, the type and concentration of catalyst, the proportion of cyclic reactant in the feed, and the temperature at which the physical texture is observed.

When copolymers are prepared according to this invention, using copolymerization temperatures below —50° C., the resultant products will generally have average molecular weights above 6,000, and preferably 10,000 to 150,000, with intrinsic viscosities above 0.7 and preferably 0.8 to 3.0. The higher molecular weight and intrinsic viscosities are obtained with the lowest copolymerization temperatures, and they are also favored by the lower content of cyclic reactant, i. e., a percent of combined styrene of 20 to 40%. The hardness of the copolymer generally increases with increasing content of combined styrene or other cyclic constituents.

The bituminous material to be oxidized and compounded with the above-described copolymer may be selected from a wide variety of natural and industrial products. For instance, various natural asphalts may be used such as natural Trinidad, Bermudez, Gilsonite, Grahamite and Cuban. Various petroleum asphalts may be usd such as those obtained from California or Mid-Continent crudes. Mexican petroleum asphalt, as well as tarry residues known as cracking coil tar obtained as a by-product during the cracking of gas oil or other heavier petroleum fractions to obtain gasoline or other lighter fractions. Although the above-mentioned natural and petroleum asphalts are preferred, still further bitminous materials may be used such as coal tar, wood tar and pitches obtained from various industrial processes, such as a fatty acid pitch.

The asphalt may be oxidized in batch or continuous processes. However, it is preferred to carry out the oxidation in vertical tanks with considerable asphalt level above the air inlet sprays since the longer the contact between air and asphalt, the faster is the oxidation for a given temperature. For safe operation and proper product quality, the oxidizing temperature should be at least 50° F. below the flash point of the asphalt. The heat output is controlled by regulating the rate of air injection so as to maintain the proper oxidizing temperature and avoid cracking.

The term "asphalt" as used in the present specification is intended to mean the asphaltic bitumen per se without any added dust, sand, gravel, etc., as commonly used in talking about paving asphalt. Whatever the bitumen is which is used according to the present invention, but particularly in the case of petroleum asphalt, it may have been subjected to any of the commonly used refining or treating processes, such as distillation, steam reduction, in addition to air blowing or other oxidizing treatment.

The invention may also be applied to the use of oxidized asphalt or other butuminous materials in a cut-back condition, i. e. dissolved in a volatile solvent such as kerosene, toluene, petroleum aromatic solvent fraction, benzene or petroline or also when emulsified with water, either in the form of an oil-in-water type emulsion or as a water-in-oil type emulsion.

The vacuum-reduced asphalt to be added to form the composition of the present invention is the product obtained by the straight reduction under vacuum of paraffin-free asphaltic base rudes, especially those from the western part of Venezuela. The crude coming from the Lagunillas field is particularly desirable for this purpose.

The oil to be added may be any aromatic, naphthenic or paraffinic oil but is preferably a black naphthenic oil having a viscosity from 70 to 1000, preferably 80 to 120 at 210° F.

The proportions in which the primary constituents of this invention, namely, the bituminous material, the oil, and the copolymer, are to be mixed, will, of course, depend upon the intended use of the composition but should broadly range from 1 to 3% by weight each of the copolymer and oil based on the total asphalt, but large amounts up to 15% or more may be used when desired. It is important, however, that the oil and copolymer be mixed in equal proportions since this produces the greatest incremental increase in ductility.

The oxidized asphalt should comprise the major proportion of the total asphalt content and runs preferably from 60–90% by weight while the vacuum-reduced asphalt is 40–10% of the mixture.

In carrying out the invention, the constituents may be compounded in any desired manner, but the preferred procedure will, of course, depend upon the relative proportions of the two primary constituents as well as the type and quantity of any other liquid or solid additives to be used. However, if a small amount of copolymer and oil is to be incorporated into a large amount of bituminous material without the use of any solvents, the asphalt or other bituminous materials may simply be melted, either by direct firing in a kettle by the use of steam coils or a steam jacket, and then the copolymer added to it with stirring either in the form of small solid pieces or chunks or in a molten or at least heat-softened condition. Another alternative in making such compositions is to make a master batch of asphalt copolymer of much higher copolymer content than desired in the finished mixture, for instance, by compounding one part of asphalt with 1 to 5 parts by weight of copolymer, by gradually adding the heat-softened asphalt into the copolymer while the latter is being mechanically worked in a hot kneader or on hot steel rolls such as those used in the conventional rubber mill; then, of course, the desired amount of such a master-batch may then readily be blended into a larger batch of molten asphalt.

The object, advantage and details of the invention will be better understood from a consideration of the following experimental data.

*Example 1*

A mixture of 80% oxidized asphalt from Lagunillas crude and 20% asphalt from the vacuum distillation of Lagunillas crude containing 2.0% by weight of a lubricating oil and 2.0% by weight of a copolymer of 50% by weight of styrene and 50% by weight of isobutylene was prepared and the physical characteristics determined and compared with those of the oxidized asphalt and the vacuum reduced asphalt alone and with the mixture of the two containing the lubricating oil but no copolymer. The results are shown in the following table:

|  | A<br>Asphalt from Vacuum Distillation of Lago Crude Oil | B<br>Oxidized Lagunillas Asphalt | C<br>Oxidized Lagunillas Asphalt | D<br>Blend of Flux A,[1] Oxidized Asphalt (B) Lubricating Oil, and Polymer | E<br>Blend of Flux A,[1] Oxidized Asphalt (B), and Lubricating Oil |
|---|---|---|---|---|---|
| Wt. Percent of Vacuum Reduced Lagunillas Asphalt | 100 | 0 | 0 | 20.0 | 20.4 |
| Wt. Percent of 180° F. Softening Point Oxidized Lagunillas Asphalt | 0 | 100 | 96.0 | 76.0 | 77.6 |
| Wt. Percent of Lubricating Oil | 0 | 0 | 2.0 | 2.0 | 2.0 |
| Wt. Percent of S-50 Polymer | 0 | 0 | 2.0 | 2.0 | 0.0 |
| Laboratory Inspections: | | | | | |
| Softening Point, ° F | 134 | 191 | 201 | 169 | 152 |
| Penetration— | | | | | |
| @ 32° F., 200 grams, 1 min., mm.× 10 | 14½ | 16 | 20 | 26 | 32 |
| @ 77° F., 100 grams, 5 sec., mm.×10 | 45 | 25 | 28 | 42 | 51 |
| @ 100° F., 100 grams, 5 sec., mm.×10 | 135 | 47 | 52 | 86 | 100 |
| @ 115° F., 50 grams, 5 sec., mm.×10 | 209 | 49 | 54½ | 89 | 94 |
| Ductility— | | | | | |
| @ 39.2° F., 5 cm./min., cm | 1½ | 1 | 4 | 7 | 3¾ |
| @ 39.2° F., 1 cm./min., cm | 9¾ | 2½ | 6¼ | 7 | 3½ |
| @ 77° F., 5 cm/min., cm | 125 | 4 | 77 | 121 | 8 |

[1] Asphalt from Lagunillas crude oil.

From the above data it may be seen that Softening Points of B and C are higher than A. It will also be noted that the penetration tests of B and C are affected to a much lower degree by changes of temperature than is the case for A, which gets very soft at 115° F. The ductility of C, while not as good as A, shows a marked improvement over B due to adding a small quantity of lubricating oil and S–50 polymer without materially changing the softening point or penetration characteristics. The ductility of D, compared with C, shows a further improvement due to adding a minor portion of vacuum reduced asphalt and is as good as A in this regard. Although some loss of softening point and penetration quality is experienced in D compared to C, D is much superior to A in these properties. D compared to E shows the effect of S–50 polymer and it may be seen that when the S–50 polymer is omitted the ductility is very poor and the softening point and penetration properties are reduced.

The nature of the present invention having been thus fully set forth and specific examples of the same given, what is claimed as new and useful and desired to be secured by Letters Patent is:

1. A method of improving the ductility of oxidized asphalt which comprises mixing with oxidized asphalt equal proportions of, in amounts of 1 to 3% by weight based on the asphalt, a copolymer of an aliphatic mono-olefin and an aromatic mono-olefin and a hydrocarbon oil having a viscosity at 210° F. between 70 and 1000, and 10–40% by weight of a vacuum-reduced asphalt the copolymer containing about 20 to 80% of said aromatic aromatic mono-olefin.

2. Method according to claim 1 in which the copolymer is a copolymer of isobutylene and styrene.

3. An asphalt composition of improved ductility comprising 60–90% of an oxidized asphalt, 10–40% of a vacuum-reduced asphalt, equal proportions of, in amounts of 1 to 3% by weight based on the asphalt, a copolymer of an aliphatic mono-olefin and an aromatic mono-olefin and a hydrocarbon oil having a viscosity at 210° F. between 70 and 1000 the copolymer containing about 20 to 80% of said aromatic mono-olefin.

4. Composition according to claim 3 in which the copolymer is a copolymer of isobutylene and styrene.

5. An asphalt composition of improved ductility comprising about 80% of an oxidized asphalt, about 20% of a vacuum-reduced asphalt, and equal proportions, in amounts of 1 to 3% by weight based on total asphalt, of a copolymer of an aliphatic mono-olefin and an aromatic mono-olefin and a hydrocarbon oil having a viscosity at 210° F. between 70 and 1000 the copolymer containing about 20 to 80% of said aromatic mono-olefin.

6. Composition according to claim 5 in which the copolymer is a copolymer of isobutylene and styrene.

References Cited in the file of this patent
FOREIGN PATENTS 927,636   France _____ May 5, 1947